United States Patent
Park

(10) Patent No.: US 11,746,896 B2
(45) Date of Patent: Sep. 5, 2023

(54) METHOD AND DEVICE FOR CONTROLLING TRANSMISSION OF VEHICLE

(71) Applicants: Hyundai Motor Company, Seoul (KR); Kia Corporation, Seoul (KR)

(72) Inventor: Jungho Park, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/959,754

(22) Filed: Oct. 4, 2022

(65) Prior Publication Data

US 2023/0184328 A1    Jun. 15, 2023

(30) Foreign Application Priority Data

Dec. 9, 2021  (KR) .................. 10-2021-0175978

(51) Int. Cl.
| | |
|---|---|
| *F16H 61/16* | (2006.01) |
| *F16H 59/58* | (2006.01) |
| *F16H 59/72* | (2006.01) |
| *F16H 59/70* | (2006.01) |
| *F16H 59/18* | (2006.01) |
| *F16H 59/48* | (2006.01) |
| *F16H 59/74* | (2006.01) |

(52) U.S. Cl.
CPC .............. *F16H 61/16* (2013.01); *F16H 59/18* (2013.01); *F16H 59/48* (2013.01); *F16H 59/58* (2013.01); *F16H 59/70* (2013.01); *F16H 59/72* (2013.01); *F16H 59/74* (2013.01)

(58) Field of Classification Search
CPC .......... F16H 59/18; F16H 59/48; F16H 59/58; F16H 59/66; F16H 59/70; F16H 59/72; F16H 59/74; F16H 2059/082; F16H 61/16

See application file for complete search history.

(56) References Cited

U.S. PATENT DOCUMENTS

| | | | | |
|---|---|---|---|---|
| 5,103,398 | A * | 4/1992 | Akiyama | B60K 28/165 180/197 |
| 2010/0131122 | A1* | 5/2010 | Dersjo | E02F 9/2253 701/2 |
| 2012/0220422 | A1* | 8/2012 | Wurthner | B60W 10/06 477/79 |
| 2015/0166040 | A1* | 6/2015 | Cho | B60W 10/113 701/53 |
| 2019/0011031 | A1* | 1/2019 | Lee | F16H 48/06 |

* cited by examiner

*Primary Examiner* — Edwin A Young
(74) *Attorney, Agent, or Firm* — MORGAN, LEWIS & BOCKIUS LLP

(57) ABSTRACT

A method of controlling a transmission of a vehicle, includes determining, by a controller, whether a shift prohibition condition for preventing overheating of the transmission of the vehicle in a terrain mode, which is a rough road driving mode of the vehicle, is satisfied; determining, by the controller, whether a shift operation of the transmission corresponding to a busy shift phenomenon of the transmission is detected when the shift prohibition condition is satisfied; and prohibiting, by the controller, shifting of the transmission when the shift operation of the transmission corresponding to the busy shift phenomenon of the transmission is detected.

12 Claims, 2 Drawing Sheets

METHOD AND DEVICE FOR CONTROLLING TRANSMISSION OF VEHICLE

CROSS-REFERENCE TO RELATED APPLICATION

The present application claims priority to Korean Patent Application No. 10-2021-0175978 filed on Dec. 9, 2021, the entire contents of which is incorporated herein for all purposes by this reference.

BACKGROUND OF THE PRESENT DISCLOSURE

Field of the Present Disclosure

The present disclosure relates to a vehicle, and more particularly, to a method and a device for controlling a transmission of a vehicle.

Description of Related Art

In general, various driving systems are provided in a vehicle to realize optimal driving according to a road surface (topography). Various driving systems have a separate switch for each driving system, and the driving system is individually switched through manipulation of the corresponding switch.

For example, the driving system may enable a driving mode of the vehicle according to the terrain to be selected by a switch for setting a terrain mode of the vehicle, so that the vehicle may be driven in an optimal driving condition. The terrain mode of the vehicle may include a driving mode of the vehicle optimized according to a road surface condition (for example, a snowy road, a muddy road, or a sandy road).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and a device configured for controlling a transmission of a vehicle which are configured for prohibiting a shifting operation of the transmission when a shift prohibition condition for preventing overheating of the transmission of the vehicle is satisfied and a shifting operation of the transmission corresponding to a busy shift phenomenon of the transmission is detected in a terrain mode, which is a rough road driving mode of the vehicle.

Various aspects of the present disclosure are directed to providing a method of controlling a transmission of a vehicle, the method including: determining, by a controller, whether a shift prohibition condition for preventing overheating of the transmission of the vehicle in a terrain mode, which is a rough road driving mode of the vehicle, is satisfied; determining, by the controller, whether a shift operation of the transmission corresponding to a busy shift phenomenon of the transmission is detected when the shift prohibition condition is satisfied; and prohibiting, by the controller, shifting of the transmission when the shift operation of the transmission corresponding to the busy shift phenomenon of the transmission is detected.

The method may further include entering, by the controller, the vehicle into the terrain mode.

The shift prohibition condition may be a condition in which the vehicle turns in a sand mode which is included in the terrain mode and in which the vehicle is driven on a sandy road.

The shift prohibition condition may be a condition in which an operation mode of the vehicle is activated as the sand mode according to an operation mode input signal of a driver of the vehicle, a condition in which a rotation angle of a steering wheel of the vehicle is equal to or greater than a reference rotation angle, a condition in which revolutions per minute (RPM) of an engine of the vehicle is equal to or greater than a reference RPM, a condition in which a position value of an accelerator pedal of the vehicle is equal to or greater than a reference acceleration position value, a condition in which an absolute value of a lateral acceleration of the vehicle is equal to or less than a reference lateral acceleration value, a condition in which a gear shifting stage of the transmission is a first gear stage or a second gear stage, and a condition in which an oil temperature of the transmission is equal to or greater than a reference temperature.

The shift operation of the transmission corresponding to the busy shift phenomenon of the transmission may include an operation of shifting the transmission to the first gear stage after the transmission is shifted from the first gear stage to the second gear stage.

The controller may prohibit shifting of the transmission for a reference time.

Various aspects of the present disclosure are directed to providing a device configured for controlling a transmission of a vehicle, the device including: a data detector including a steering wheel rotation angle detection sensor which is configured to detect a rotation angle of a steering wheel of a vehicle; and a controller configured for determining whether a shift prohibition condition which is a condition for preventing overheating of the transmission of the vehicle in a terrain mode, which is a rough road driving mode of the vehicle, and is determined according to information provided from the data detector is satisfied, in which the controller is configured to determine whether a shift operation of the transmission corresponding to a busy shift phenomenon of the transmission is detected when the shift prohibition condition is satisfied, and the controller is configured to prohibit shifting of the transmission when the shift operation of the transmission corresponding to the busy shift phenomenon of the transmission is detected.

The controller may enter the vehicle into the terrain mode.

The shift prohibition condition may be a condition in which the vehicle turns in a sand mode which is included in the terrain mode and in which the vehicle is driven on a sandy road.

The shift prohibition condition may include a condition in which an operation mode of the vehicle is activated as the sand mode according to an operation mode input signal of a driver of the vehicle, a condition in which a rotation angle of a steering wheel provided by the steering wheel rotation angle detection sensor is equal to or greater than a reference rotation angle, a condition in which revolutions per minute (RPM) of an engine of the vehicle provided by an engine RPM sensor included in the data detector is equal to or greater than a reference RPM, a condition in which a position value of an accelerator pedal of the vehicle provided by an accelerator pedal sensor included in the data detector is equal to or greater than a reference acceleration position value, a condition in which an absolute value of a lateral acceleration of the vehicle provided by a lateral acceleration detection sensor included in the data detector is equal to or less than a reference lateral acceleration value, and a condition in which a gear shifting stage of the transmission is a first gear stage or a second gear stage, and a condition in which an oil temperature of the transmission provided by a temperature sensor included in the data detector is equal to or greater than a reference temperature.

The shift operation of the transmission corresponding to the busy shift phenomenon of the transmission may include an operation of shifting the transmission to the first gear stage after the transmission is shifted from the first gear stage to the second gear stage.

The controller may prohibit shifting of the transmission for a reference time.

The method and the device configured for controlling the transmission of the vehicle according to the exemplary embodiments of the present disclosure may prohibit a shift operation of the transmission when in the terrain mode, which is the rough road driving mode of the vehicle, the shift prohibition condition to prevent overheating of the transmission of the vehicle is satisfied and a shift operation of the transmission corresponding to the busy shift phenomenon of the transmission is detected. Accordingly, because a clutch of the transmission is not overheated when the vehicle is driven, durability of the transmission may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

To help more full understanding of the drawings used in the detailed description of the present disclosure, a brief description of each drawing is provided.

Figure 1:
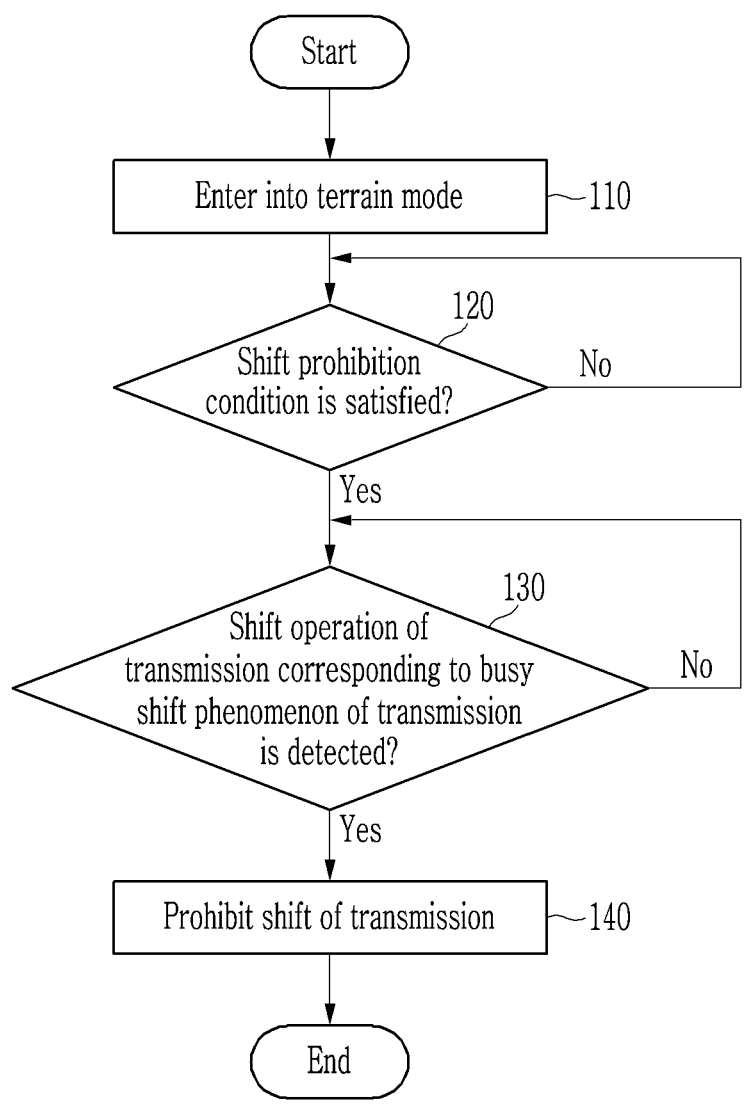
FIG. 1 is a flowchart for describing a method of controlling a transmission of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the present disclosure and the object achieved by the implementation of the present disclosure, reference should be made to the accompanying drawings illustrating the exemplary embodiment of the present disclosure and the contents described in the accompanying drawings.

Hereinafter, the present disclosure will be described in detail by describing the exemplary embodiment of the present disclosure with reference to the accompanying drawings. In the following description of the exemplary embodiment of the present disclosure, a detailed description of known configurations or functions incorporated herein will be omitted when it is judged that the detailed description may make the subject matter of the present disclosure unclear. Like reference numerals presented in each drawing designate like elements throughout the specification.

The term used in the present specification is simply used for describing a specific embodiment and does not intend to limit the present disclosure. A singular expression includes a plural expression unless it is specifically described to the contrary in the context. In the present specification, it should be appreciated that terms "including" and "having" are intended to designate the existence of characteristics, numbers, operations, operations, constituent elements, and components described in the specification or a combination thereof, and do not exclude a possibility of the existence or addition of one or more other characteristics, numbers, operations, operations, constituent elements, and components, or a combination thereof in advance.

Throughout the present specification, when it is described that an element is "coupled" to another element, the element may be "directly coupled" to the another element or "electrically or mechanically coupled" to the another element with a yet another element interposed therebetween.

All terms used herein including technical or scientific terms have the same meanings as meanings which are generally understood by those skilled in the art to which an exemplary embodiment of the present disclosure pertains unless they are differently defined. Terms defined in generally used dictionary shall be construed to have meanings matching those in the context of a related art, and shall not be construed as ideal or excessively formal meanings unless they are clearly defined in the present application.

According to the related art, when a vehicle is turning (turning driving) in the sand mode in the terrain mode which is the operation mode of the vehicle, a busy shift phenomenon may occur due to the road surface resistance of the sand road and the wheel slip of the vehicle. Damage of the transmission of the vehicle (for example, damage to the clutch of the transmission) may occur due to overheating of the transmission of the vehicle due to the busy shift phenomenon.

A busy shift phenomenon (a frequent shifting phenomenon or a busy shift operation) is a situation in which shifting is repeated within a short time, and for example, it is a phenomenon in which an operation of shifting a gear shifting stage of the transmission to the second gear stage immediately after shifting the gear shifting stage of the transmission to the first gear stage continuously occurs.

Figure 2:
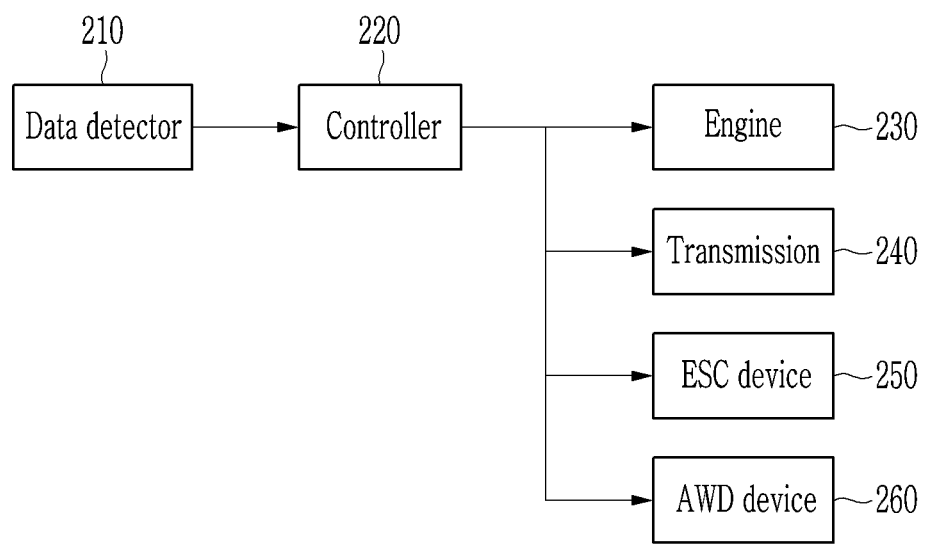
FIG. 2 is a block diagram illustrating a device configured for controlling a transmission of a vehicle to which the method of controlling the transmission of the vehicle illustrated in FIG. 1 is applied.

FIG. 1 is a flowchart for describing a method of controlling a transmission of a vehicle according to various exemplary embodiments of the present disclosure. FIG. 2 is a block diagram illustrating a device configured for controlling a transmission of a vehicle to which the method of controlling the transmission of the vehicle illustrated in FIG. 1 is applied.

Referring to FIG. 1 and FIG. 2, in a determination operation 110, a controller 220 may enters an operation mode of a vehicle into a terrain mode (or a rough road driving mode) in response to an operation mode input signal of a driver of the vehicle through a switch. The terrain mode may be a driving mode of the vehicle that provides stable traction to the vehicle according to the condition (situation) of the road surface (for example, snowy road, muddy road, or sandy road) on which the vehicle travels. In the terrain mode, the controller 220 is configured to control an engine 230, a transmission 240, such as an automatic transmission, an Electronic Stability Control (ESC) device (body posture control device) 250 for controlling braking of left and right wheels of the vehicle to prevent the vehicle from slipping, and an All Wheel Drive (AWD) device (or wheel driving device) 260 that operates four wheels (or driving wheels) of the vehicle and distributes the driving force of the engine 230 to the wheels when slipping of the front and rear wheels of the vehicle occurs, to enable the vehicle to realize (exhibit) optimal driving performance according to the condition of the road surface (for example, a snowy road, a muddy road, or a sandy road).

For example, the terrain mode may include a sand mode in which the vehicle is driven on a sandy road, a snow mode in which the vehicle is driven on a snowy road, and a mud mode in which the vehicle is driven on a muddy road.

In the sand mode, the controller 220 smoothly transmits the driving force of the engine to the four wheels by controlling the engine 230, the transmission 240, the ESC device 250, and the AWD device 260, and maintains the driving force of the front and rear wheels of the vehicle at a ratio of 50:50 to prevent the vehicle stuck in the sand.

In the snow mode, the controller 220 distributes the driving force of the engine to the wheel of the vehicle that does not slip or prevents the relatively large driving force of the engine from being transmitted to the wheels of the vehicle by controlling the engine 230, the transmission 240, the ESC device 250, and the AWD device 260, to prevent the vehicle from slipping or allow the engine's driving force to be smoothly output.

In the mud mode, the controller 220 may instantaneously transmit the large driving force (the driving force of the engine) to four wheels of the vehicle by controlling the engine 230, the transmission 240, the ESC device 250, and the AWD device 260.

As illustrated in FIG. 2, the vehicle may include a data detector 210, a controller 220, the engine 230, the transmission 240, the ESC device 250, and the AWD device 260. The device configured for controlling the transmission of the vehicle may include the data detector 210 and the controller 220.

The controller 220 may control the entire operations of the vehicle as an electronic control unit (ECU). The controller 220 may be, for example, one or more microprocessors operating by a program (control logic) or hardware (for example, a microcomputer) including the microprocessor, and the program may include a series of instructions for performing the method of controlling a transmission of a vehicle according to various exemplary embodiments of the present disclosure. The instruction may be stored in a memory of the controller 220.

According to operation 120 illustrated in FIG. 1, after operation 110, the controller 220 may determine whether the shift prohibition condition for preventing overheating of the transmission 240 of the vehicle is satisfied in the terrain mode which is a rough road driving mode of the vehicle.

The shift prohibition condition may be a condition in which the vehicle turns in a sand mode in the terrain mode. For example, the shift prohibition condition may include a condition in which the operation mode of the vehicle is activated as the sand mode in the terrain mode by an operation mode input signal of a driver of the vehicle, a condition in which a rotation angle of a steering wheel (handle) of the vehicle is equal to or greater than a reference rotation angle, a condition in which the revolutions per minute (RPM) of the engine 230 is equal to or greater than a reference RPM, a condition in which a position value of a vehicle's accelerator pedal (the degree to which the accelerator pedal is pressed) is equal to or greater than a reference acceleration position value, a condition in which an absolute value of a vehicle's lateral acceleration is equal to or less than a reference lateral acceleration value, a condition in which the gear shifting stage of the transmission 240 is the first gear stage or the second gear stage, and a condition in which a temperature of the oil of the transmission 240 is equal to or greater than a reference temperature. When the accelerator pedal is completely pressed, the position value of the accelerator pedal may be 100%, and when the accelerator pedal is not pressed, the position value of the accelerator pedal may be 0%. The reference rotation angle (rotation angle reference value), the reference RPM (reference RPM value), the reference acceleration position value, the reference lateral acceleration value, and the reference temperature may be determined by a test (or experiment).

The data detector 210 may include a steering wheel rotation angle detection sensor configured for detecting a rotation angle of the steering wheel of the vehicle and providing the detected rotation angle to the controller 220, an engine RPM sensor configured for detecting the RPM of the engine 230 and providing the detected RPM of the engine to the controller 220, an accelerator pedal sensor configured for detecting a position value of the accelerator pedal and providing the detected position value to the controller 220, a lateral acceleration detection sensor configured for detecting a lateral acceleration of the vehicle and providing the detected lateral acceleration to the controller 220, and a temperature sensor configured for detecting an oil temperature of the transmission 240 and providing the detected temperature to the controller 220.

According to operation 130, when the shift prohibition condition is satisfied, the controller 220 may determine whether a shift operation of the transmission corresponding to a busy shift phenomenon of the transmission 240 is detected. For example, the shift operation of the transmission corresponding to the busy shift phenomenon of the transmission may include an operation of shifting the transmission to the first gear stage after the transmission is shifted from the first gear stage to the second gear stage.

According to operation 140, when the shift operation of the transmission corresponding to the busy shift phenomenon of the transmission is detected, the controller 220 may prohibit the shift of the transmission 240 for a reference period of time (for example, 16 seconds) to maintain the gear shifting stage (for example, the first gear stage) of the transmission.

The constituent element, " "-unit" or "-device", a block, or a module used in the exemplary embodiment of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, "-unit" or the like may also be included in a computer readable storage medium, and a part thereof may be distributed in the plurality of computers.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a transmission of a vehicle, the method comprising:
    determining, by a controller, whether a shift prohibition condition for preventing overheating of the transmission of the vehicle in a terrain mode, which is a rough road driving mode of the vehicle, is satisfied;
    determining, by the controller, whether a shift operation of the transmission corresponding to a busy shift phenomenon of the transmission is detected when the shift prohibition condition is satisfied; and
    prohibiting, by the controller, shifting of the transmission when the shift operation of the transmission corresponding to the busy shift phenomenon of the transmission is detected.

2. The method of claim 1, further including:
    entering, by the controller, the vehicle into the terrain mode.

3. The method of claim 1, wherein the shift prohibition condition is a condition in which the vehicle turns in a sand mode which is included in the terrain mode and in which the vehicle is driven on a sandy road.

4. The method of claim 3, wherein the shift prohibition condition includes at least one of a condition in which an operation mode of the vehicle is activated as the sand mode according to an operation mode input signal of a driver of the vehicle, a condition in which a rotation angle of a steering wheel of the vehicle is equal to or greater than a reference rotation angle, a condition in which revolutions per minute (RPM) of an engine of the vehicle is equal to or greater than a reference RPM, a condition in which a position value of an accelerator pedal of the vehicle is equal to or greater than a reference acceleration position value, a condition in which an absolute value of a lateral acceleration of the vehicle is equal to or less than a reference lateral acceleration value, a condition in which a gear shifting stage of the transmission is a first gear stage or a second gear stage, and a condition in which an oil temperature of the transmission is equal to or greater than a reference temperature.

5. The method of claim 1, wherein the shift operation of the transmission corresponding to the busy shift phenomenon of the transmission includes an operation of shifting the transmission to a first gear stage after the transmission is shifted from the first gear stage to a second gear stage.

6. The method of claim 1, wherein the controller is configured to prohibit shifting of the transmission for a reference time.

7. An apparatus of controlling a transmission of a vehicle, the apparatus comprising:
- a data detector including a steering wheel rotation angle detection sensor which is configured to detect a rotation angle of a steering wheel of the vehicle; and
- a controller configured for determining whether a shift prohibition condition which is a condition for preventing overheating of the transmission of the vehicle in a terrain mode, which is a rough road driving mode of the vehicle, and is determined according to information provided from the data detector is satisfied,
- wherein the controller is configured to determine whether a shift operation of the transmission corresponding to a busy shift phenomenon of the transmission is detected when the shift prohibition condition is satisfied, and
- wherein the controller is configured to prohibit shifting of the transmission when the shift operation of the transmission corresponding to the busy shift phenomenon of the transmission is detected.

8. The apparatus of claim 7, wherein the controller is configured to enter the vehicle into the terrain mode.

9. The apparatus of claim 7, wherein the shift prohibition condition is a condition in which the vehicle turns in a sand mode which is included in the terrain mode and in which the vehicle is driven on a sandy road.

10. The apparatus of claim 9, wherein the shift prohibition condition includes at least one of a condition in which an operation mode of the vehicle is activated as the sand mode according to an operation mode input signal of a driver of the vehicle, a condition in which a rotation angle of a steering wheel provided by the steering wheel rotation angle detection sensor is equal to or greater than a reference rotation angle, a condition in which revolutions per minute (RPM) of an engine of the vehicle provided by an engine RPM sensor included in the data detector is equal to or greater than a reference RPM, a condition in which a position value of an accelerator pedal of the vehicle provided by an accelerator pedal sensor included in the data detector is equal to or greater than a reference acceleration position value, a condition in which an absolute value of a lateral acceleration of the vehicle provided by a lateral acceleration detection sensor included in the data detector is equal to or less than a reference lateral acceleration value, and a condition in which a gear shifting stage of the transmission is a first gear stage or a second gear stage, and a condition in which an oil temperature of the transmission provided by a temperature sensor included in the data detector is equal to or greater than a reference temperature.

11. The apparatus of claim 7, wherein the shift operation of the transmission corresponding to the busy shift phenomenon of the transmission includes an operation of shifting the transmission to a first gear stage after the transmission is shifted from the first gear stage to a second gear stage.

12. The apparatus of claim 7, wherein the controller is configured to prohibit shifting of the transmission for a reference time.

* * * * *